United States Patent
Kosaka et al.

(10) Patent No.: US 7,535,626 B2
(45) Date of Patent: May 19, 2009

(54) SHAPE-VARIABLE OPTICAL ELEMENT, OPTICAL DEVICE AND IMAGE PICKUP APPARATUS

(75) Inventors: Akira Kosaka, Yao (JP); Tomoo Izumi, Toyonaka (JP); Mitsuhiro Fukuda, Chofu (JP)

(73) Assignee: Konica Minolta Opto, Inc., Hachioji-Shi (JP)

( * ) Notice: Subject to any disclaimer, the term of this patent is extended or adjusted under 35 U.S.C. 154(b) by 0 days.

(21) Appl. No.: 11/807,667

(22) Filed: May 30, 2007

(65) Prior Publication Data

US 2007/0279732 A1    Dec. 6, 2007

(30) Foreign Application Priority Data

Jun. 6, 2006    (JP)    ............................. 2006-157017

(51) Int. Cl.
*G02F 1/29* (2006.01)
*G02B 7/182* (2006.01)

(52) U.S. Cl. ....................... 359/319; 359/846
(58) Field of Classification Search .................. 359/319
See application file for complete search history.

(56) References Cited

U.S. PATENT DOCUMENTS

2005/0030438 A1* 2/2005 Nishioka ..................... 349/21
2005/0036195 A1* 2/2005 Nishioka ..................... 359/291

FOREIGN PATENT DOCUMENTS

| JP | 11-76800 A | 3/1999 |
|---|---|---|
| JP | 11-80647 A | 3/1999 |
| JP | 11-319538 A | 11/1999 |
| JP | 2000-105306 A | 4/2000 |
| JP | 2000-123634 A | 4/2000 |
| JP | 2000-124157 A | 4/2000 |
| JP | 2000-239853 A | 9/2000 |
| JP | 2001-35255 A | 2/2001 |
| JP | 2001-53028 A | 2/2001 |
| JP | 2001-254185 A | 9/2001 |
| WO | 99-18456 A1 | 4/1999 |

OTHER PUBLICATIONS

Y. Nagata, "At the Forefront of Soft Actuator Development", NTS Inc., Sep. 2004, pp. 141.
K. Asaka, "High Molecular Actuator Material", High Polymer, Japan Society of High Polymer, Jul. 2001, vol. 50, pp. 450-453.

* cited by examiner

*Primary Examiner*—Jordan M. Schwartz
*Assistant Examiner*—James C Jones
(74) *Attorney, Agent, or Firm*—Sidley Austin LLP

(57) ABSTRACT

A shape-variable optical element, which includes: a shape-variable section made up of an organic material that can be expanded and contracted by an electric field, in a direction of the electric field; and a pair of electrode layers to sandwich the shape-variable section, wherein amounts of expansion and contraction of the shape-variable section, which are generated by the electric field when a voltage is applied to the pair of electrode layers, have a distribution pattern in a surface perpendicular to the electric field.

11 Claims, 8 Drawing Sheets

PIEZOELECTRIC CONSTANT

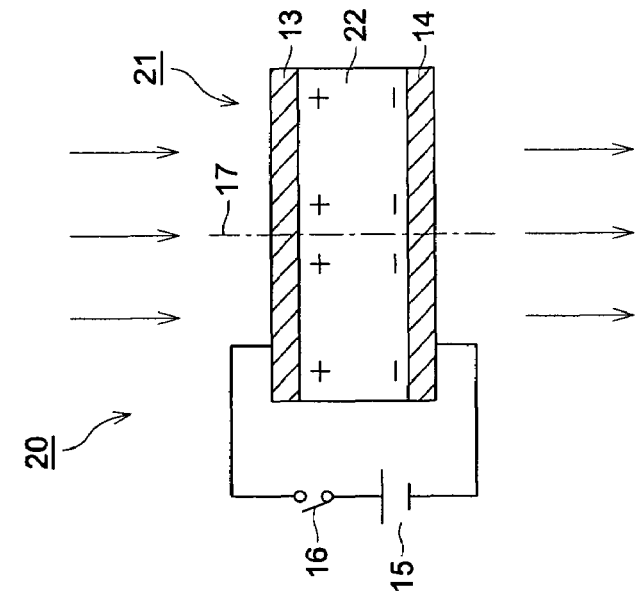
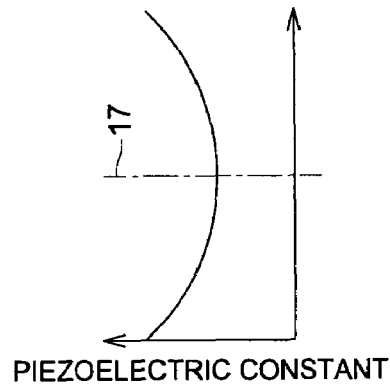
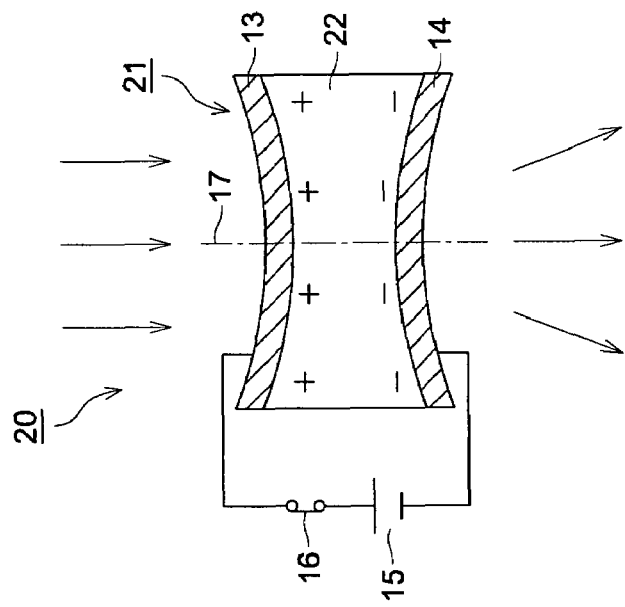

PIEZOELECTRIC CONSTANT

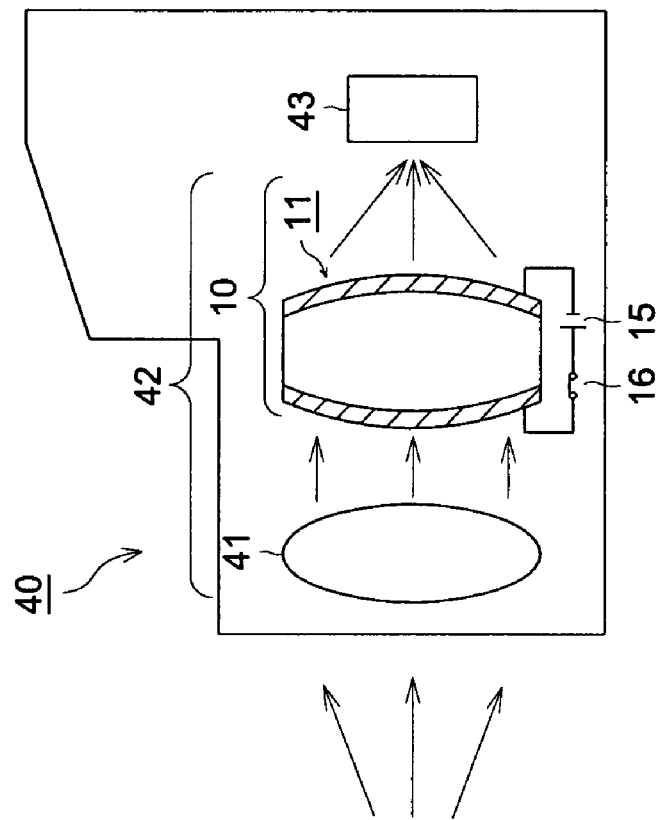
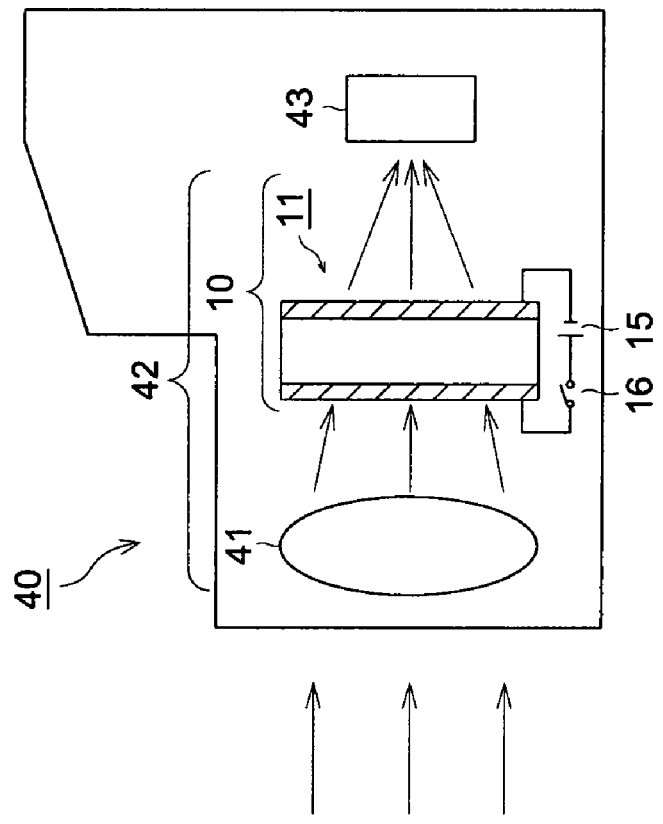

ELECTROSTRICTIVE STRAIN
AMOUNT PER UNIT ELECTRIC FIELD

PIEZOELECTRIC CONSTANT

SHAPE-VARIABLE OPTICAL ELEMENT, OPTICAL DEVICE AND IMAGE PICKUP APPARATUS

CROSS REFERENCE TO RELATED APPLICATION

The present application is based on Japanese Patent Application No. 2006-157017 filed with Japan Patent Office on Jun. 6, 2006, the entire content of which is hereby incorporated by reference.

BACKGROUND OF THE INVENTION

1. Field of the Invention

The present invention relates to a shape-variable optical element, an optical device provided therewith, and an image pickup apparatus.

2. Description of Related Art

In the conventional method, the optical element such as an optical lens is made of a rigid material such as glass and plastic. To constitute an optical system equipped with an autofocus function and optical zoom function, the optical lens must be moved mechanically in the optical direction.

An actuator such as a stepping motor, voice coil motor and piezo motor is generally employed for mechanical movement of the optical lens.

However, since such an optical system contains a movable section, manufacturing costs are high due to the complicated mechanism, and downsizing of the optical system is placed under restrictions.

To solve such problems, a variable focus lens based on the electro wetting effect has been proposed (e.g., Patent Document 1).

A proposal has been made of a reflection type shape-variable optical element wherein a piezoelectric material is used to change the curvature radius (e.g., Patent Document 2).

An optical system equipped with an autofocus function or optical zoom function can be produced by using the variable focus lens described in the Patent Document 1 or the shape-variable optical element described in the Patent Document 2, without having to use a mechanical movable section.

[Patent Document 1] International Publication Booklet No. 99/18456.

[Patent Document 2] Unexamined Japanese Patent Application Publication No. 2000-105306.

However, the variable focus lens described in the Patent Document 1 requires the shape on the interfaces of two different liquids to be stabilized, and this makes it difficult to increase the diameter. Further, such a variable focus lens that can meet the requirement is restricted only to the convex lens having a spherical form. It is not possible to meet the lenses of various shapes such as a concave lens, aspherical lens and Fresnel lens.

To make fine adjustment of the curvature radius in the shape-variable optical element described in the Patent Document 2, a piezoelectric material or electrode must be divided into a plurality of segments and voltage must be applied to each of them. This requires an unnecessarily complicated structure as an optical device.

The object of the present invention is to solve the aforementioned technical problems and to provide a shape-variable optical element characterized by a simple structure capable of increasing the diameter and meeting a great variety of shapes, an optical apparatus equipped with this shape-variable optical element, and an image pickup apparatus.

SUMMARY

The shape-variable optical element representing one aspect of the resent invention that solves the aforementioned problems is provided with a shape-variable section made of an organic material that can be expanded and contracted in the direction of electric field, and a pair of electrode layers for sandwiching the shape-variable section. This shape-variable optical element is further characterized in that the amount of expansion and contraction of the shape-variable section by the electric field formed when voltage is applied to a pair of said electrode layer is distributed within the surface perpendicular to the electric field.

BRIEF DESCRIPTION OF THE DRAWINGS

These and other objects, advantages and features of the invention will become apparent from the following description thereof taken in conjunction with the accompanying drawings in which:

FIGS. 2(a)-(c) are schematic diagrams representing an optical device using a shape-variable optical element in a second embodiment;

FIGS. 4(a)-(b) are schematic diagrams of an image pickup apparatus in a fourth embodiment;

FIGS. 7(a)-(d) are schematic diagrams representing a fabrication process of a shape-variable optical element 11a.

DETAILED DESCRIPTION OF THE PREFERRED EMBODIMENTS

The following describes the details of the embodiments of the present invention with reference to drawings:

Embodiment 1

Figure 1:
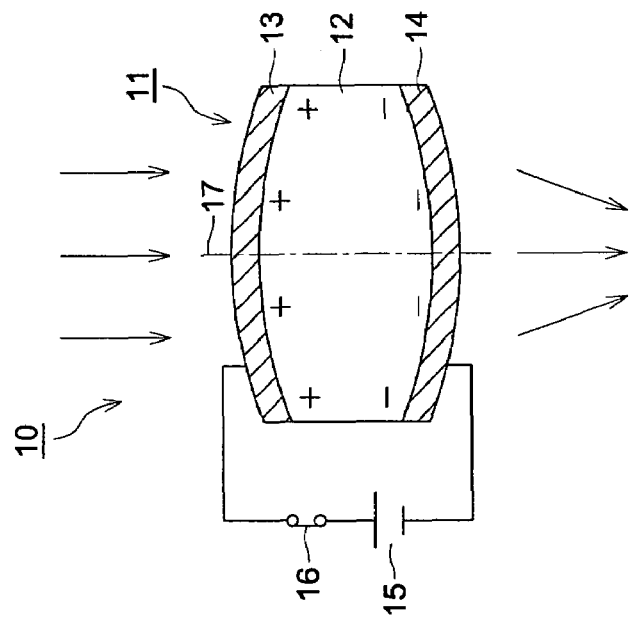
FIGS. 1(a)-(c) are schematic diagrams representing an optical device using a shape-variable optical element in a first embodiment.
Figure 1:
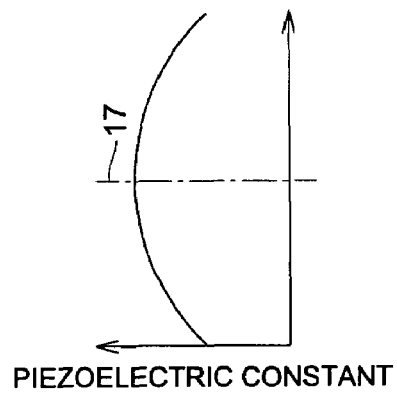
Figure 1:
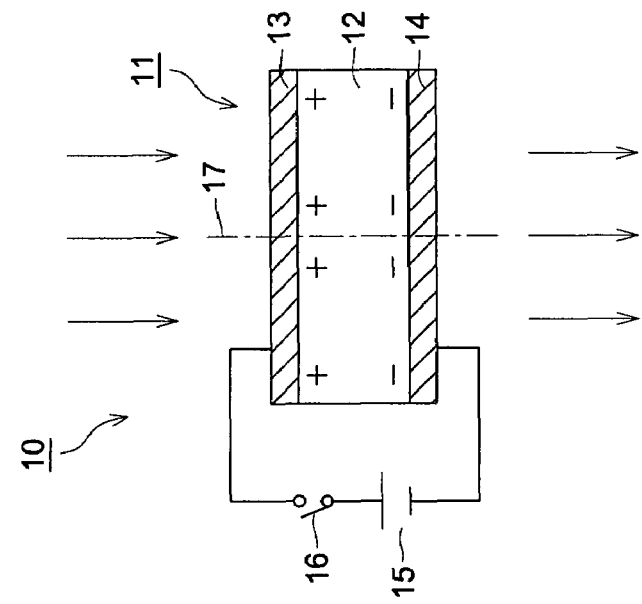

FIGS. 1(a) and (c) are schematic diagrams representing an optical device 10 using a shape-variable optical element 11 in a first embodiment.

FIG. 1(a) shows the initial status wherein voltage is not applied. It is a cross sectional view showing a shape-variable optical element 11 taken along the plane surface including the center axis. The shape-variable optical element 11 of the present embodiment is a circular tabular transmission type optical element equipped with a shape-variable section 12 made of the organic material that is expanded and contracted in the direction of electric field by electric field, and a pair of electrode layers 13 and 14 sandwiching the shape-variable section 12. A pair of the electrode layers 13 and 14 are connected to the power supply 15 through the switch 16.

The shape-variable section 12 is made of the organic material that is expanded and contracted in the direction of electric field by electric field. There is no particular restriction on the type of the organic material if only it has such properties. A proper material suitable for use can be selected from among the commonly known materials.

For example, it is possible to use a ferroelectric polymer described in Y. NAGATA "At the Forefront of Soft Actuator Development", NTS Inc., September 2004, P. 141, or the material disclosed in K. ASAKA "High Molecular Actuator Material", High Polymer, Japan Society of High Polymer, July 2001, Vol. 50, PP. 450 through 453, if it can be expanded and contracted in the direction of electric field by electric field. The materials that can be used preferably are exemplified by polyaniline, polypyrrole, polythiophene, vinylidene polyfluoride and silicone rubber. Further, the material with a variety of additives added to these materials can be used. A variety of impurities may be included if only the object of the present invention can be achieved.

Depending on the material, there are many varieties in the mechanism wherein these organic materials are expanded and contracted in the direction of electric field by electric field. Sufficient clarification has not been reached in many cases. For example, a driving force for expansion and contraction of a silicone rubber is provided by internal isolation of electrical charge by electric field. In the case of a conductive polymer such as polythiophene, the ion of the additive is moved by the electric field, whereby one end is expanded to cause expansion and contraction. In the present invention, there is no problem with the mechanism wherein these organic materials are expanded and contracted in the direction of electric field by electric field. What is only required is the function of being expanded and contracted in the direction of electric field by electric field.

In the present embodiment, vinylidene polyfluoride is used as an organic material having such properties. The vinylidene polyfluoride is a piezoelectric material, and is so constructed that the piezoelectric constant forms a distribution symmetrical with respect to the center axis 17 parallel in the direction of electric field. FIG. 1(b) shows the status of distribution of the piezoelectric constant. This vinylidene polyfluoride is a highly transparent material in visible light. The shape-variable optical element 11 can be used as a transmission type optical element that employs the light having transmitted through the shape-variable optical element 11.

Highly transparent indium oxide-tin (ITO) is used for the electrode layers 13 and 14. As shown in FIG. 1(a), the shape-variable optical element 11 is a circular tabular element when voltage is not applied. The parallel light entering the shape-variable optical element 11 from the side of the electrode layer 13 passes through the electrode layer 13, shape-variable section 12 and electrode layer 14, and is then goes out of the electrode layer 14 as the parallel light without changing its form.

There is no restriction to the material used to form the electrode layers 13 and 14 if only it is conductive on the practical level. It can be selected from among the commonly known materials.

To put it more specifically, it is possible to use platinum, gold and silver including paste-like silver, nickel, chromium, copper, iron, tin, antimony lead, tantalum, indium, palladium, tellurium, rhenium, iridium, aluminum, ruthenium, germanium, molybdenum, tungsten, tin oxide-antimony antimony, indium oxide-tin, fluorine-doped zinc oxide, zinc, carbon including graphite, glassy carbon and a carbon paste, lithium, beryllium, sodium, magnesium, potassium, calcium, scandium, titanium, manganese, zirconium, gallium, niobium, sodium, sodium-potassium alloy, mixture between magnesium and copper, mixture between magnesium and silver, mixture between magnesium and aluminum, mixture between magnesium and indium, mixture between aluminum and aluminum oxide, and mixture between lithium and aluminum.

A conductive polymer can be used as a material of the electrode layer. The conductive polymer that can be used is exemplified by the products obtained by adding, as required, appropriate additives to polyacetylene, polyaniline, polypyrrole, polythiophene, polyparaphenylene, polyethylene dioxythiophene (PEDOT), the derivative and analog thereof, the polymer containing as constituents the monomer or oligomer constituting them, if only these products are conductive on a practical level. To put it more specifically, it is possible to use a complex of polyaniline and polystyrene sulfonic acid or carboxylic acid, and a complex of polyethylene dioxythiophene and polystyrene sulfonic acid or carboxylic acid (For example, PEDOT-PSS (polyethylene dioxythiophene-polystyrene sulfonic acid)).

Further, dispersion including metallic particles can also be used as a material for electrode layer. A commonly known conductive paste can be used as the dispersion including metallic particles. The dispersion including metallic particles has preferably an average particle diameter of 1 nm or more without exceeding 50 nm, more preferably an average-particle diameter of 1 nm or more without exceeding 10 nm. Platinum, gold, silver, nickel, chromium, copper, iron, tin, antimony lead, tantalum, indium, palladium, tellurium, rhenium, iridium, aluminum, ruthenium, germanium, molybdenum, tungsten and zinc can be mentioned as the metal contained as particles. An electrode is preferably formed by using the dispersion obtained by dispersing the particles made of these metals in a dispersed solvent as a desired organic solvent, using the dispersion stabilizer made of mainly the organic material. In this case, the average diameter of the metallic particles refers to the arithmetic mean value of the projected area equivalent circle diameter. The projected area equivalent circle diameter is defined as the diameter of a circle having the same area as that of the particle projected area.

The dispersion of such metallic particles can be prepared by a physical generation method such as the in-gas evaporation method, sputtering method and metal evaporation synthesis method, as well as the chemical generation method such as a colloid method and cosedimentation method wherein metallic particles are generated by reduction of a metal ion in a liquid phase. It is preferred to use the colloid method disclosed in the Unexamined Japanese Patent Application Publication No. 11-76800, Unexamined Japanese Patent Application Publication No. 11-80647, Unexamined Japanese Patent Application Publication No. 11-319538, Unexamined Japanese Patent Application Publication No. 2000-239853, and the in-gas evaporation method described in the Unexamined Japanese Patent Application Publication No. 2000-123634, Unexamined Japanese Patent Application Publication No. 2000-123157, Unexamined Japanese Patent Application Publications No. 2001-35255, Unexamined Japanese Patent Application Publication No. 2001-53028, Unexamined Japanese Patent Application Publication No. 2001-254185.

The vinylidene polyfluoride constituting the shape-variable section 12 is polarized in such a way that one electrode layer 13 forms a cathode and the other electrode layer 14 forms an anode. Under this condition, the switch 16 is made conductive. Then the cathode side of the power supply 15 is connected to the electrode layer 13 and the anode side of the power supply 15 is connected to the electrode layer 14. Voltage is applied to a pair of electrode layers 13 and 14. In this manner, when electric field is applied in the same direction as that of the polarization, the vinylidene polyfluoride expands in the direction of electric field. In this case, the greater the piezoelectric constant, the greater will be the elongation.

Here the distribution is patterned in such a way that the piezoelectric constant is the highest at the center axis 17 parallel in the direction of electric field and is reduced symmetrically with respect to the center axis 17 on a continuous basis as one goes away from the center axis 17. Accordingly, the distribution is patterned in such a way that expansion of the shape-variable section 12 due to the electric field is again the greatest at the center axis 17, and is reduced symmetrically with respect to the center axis 17 on a continuous basis, as one goes away from the center axis 17. Thus, when no voltage is applied, the shape-variable optical element 11 is circular and tabular. When voltage is applied to a pair of electrode layers 13 and 14, it is deformed to a shape of double convex, as illustrated in FIG. 1(c). Thus, after passing through the electrode layer 13, shape-variable section 12 and electrode layer 14, the parallel light entering the shape-variable optical element 11 from the side of the electrode layer 13 goes out of the electrode layer 14 as a convergent light. Further, the voltage applied from the power supply 15 is adjusted so that the expansion of the shape-variable section 12 is controlled, whereby the shape-variable optical element can be deformed so as to get a desired curvature radius.

In this embodiment, the vinylidene polyfluoride as a piezoelectric material is utilized as the material constituting the shape-variable section 12. Thus, the expansion of the shape-variable section 12 is provided with a predetermined distribution pattern by giving a distribution pattern to the piezoelectric constant. In the case of the material expanded by other mechanisms, the physical property value of the material conforming to the mechanism is provided with a distribution pattern, whereby the same effect can be obtained. For example, in the case of P (VDF-TrFE) (vinylidene polyfluoride-ethylene trifluoride copolymer), electrostrictive strain per unit electric field should be provided with a distribution pattern.

To assign a distribution pattern to the physical properties value of the material such as piezoelectric constant and electrostrictive strain per unit electric field and to form a shape-variable section 12, materials having different characteristics should be coated on a desired position in multiple times, a trace quantity of those materials being coated at each time, for example, using the technique such as inkjet and micro contact printing methods. The organic material is a liquid whose viscosity can be freely controlled, and therefore, the adjacent materials having been coated can be mixed at the interface. This permits a continuous change of the characteristics.

The distribution of the physical property value of the material such as a piezoelectric constant is not restricted only to a spherical distribution pattern. A great variety of distribution patterns including a quadratic curve, parabola and ellipse can be utilized. Further, depending on the usage, the physical property value of the material can be provided with a stepwise distribution pattern, not a continuous distribution pattern. This arrangement permits use as a shape-variable Fresnel lens and diffraction optical element, for example.

Figure 6:
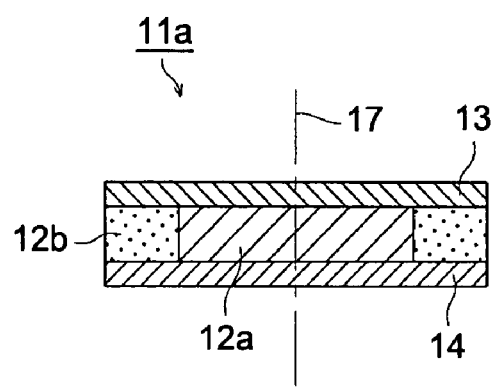
FIGS. 6(a)-(b) are schematic diagrams representing a disk type shape-variable optical element 11a to be fabricated.
Figure 6:
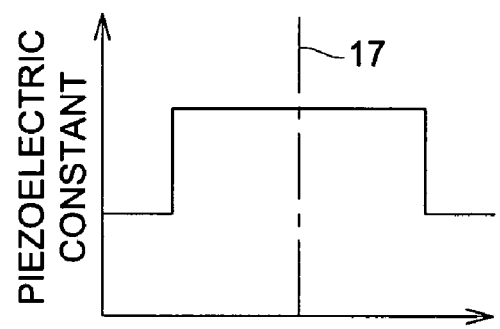

Next an example of specific fabrication method for a shape-variable optical element provided with a shape-variable section having a distribution pattern of piezoelectric constant will be described further in detail, by referring to FIGS. 6(a)-7(d). FIGS. 6(a)-(b) are schematic diagrams representing a disk type shape-variable optical element 11a to be fabricated. FIG. 6(a) represents a section view of shape-variable optical element 11a, and FIG. 6(b) represents a distribution pattern of piezoelectric constant of shape-variable optical element 11a. Further, FIGS. 7(a)-(d) are schematic diagrams representing a fabrication process of a shape-variable optical element 11a.

In shape-variable optical element 11a, a piezoelectric constant at the center area 12a of the element is higher than the piezoelectric constant at peripheral area 12b. Here, an example of the optical element having stepwise distribution of piezoelectric constant with two steps is explained. However, by utilizing a similar method, it is possible to fabricate a shape-variable optical element having a shape-variable section with piezoelectric constant distribution of further multiple steps, or a shape-variable section with continuously varying piezoelectric constant distribution, by utilizing further multiple kinds of materials or mixed material of multiple materials.

As the material constituting the center area 12a of the shape-variable section, vinylidene polyfluoride is utilized, and as the material constituting the peripheral area 12b, P(VDF-TrFE) is utilized. Piezoelectric constants of vinylidene polyfluoride and P(VDF-TrFE) to be utilized are respectively $28 \times 10{-}12$ C/N and $12 \times 10{-}12$ C/N. Further, as the material constituting electrode layers 13 and 14, PEDOT·PSS is utilized.

Previously prepared are, solution A which is obtained by solving the PEDOT·PSS in a solvent, solution B which is obtained by solving the P(VDF-TrFE) in a solvent, and solution C which is obtained by solving the vinylidene polyfluoride in a solvent. Viscosity of each solution is adjusted to be approximately 100 P (poise).

Further, three kinds of stamps to be used for printing are prepared, which are a circular stamp A having an outer diameter of 3 mm, a toroidal stamp B having an outer diameter of 5 mm and an inner diameter of 3 mm, and a circular stamp C having an outer diameter of 3 mm. As a material for these stamps, such as polydimethylsiloxane is preferably used.

Figure 7A:
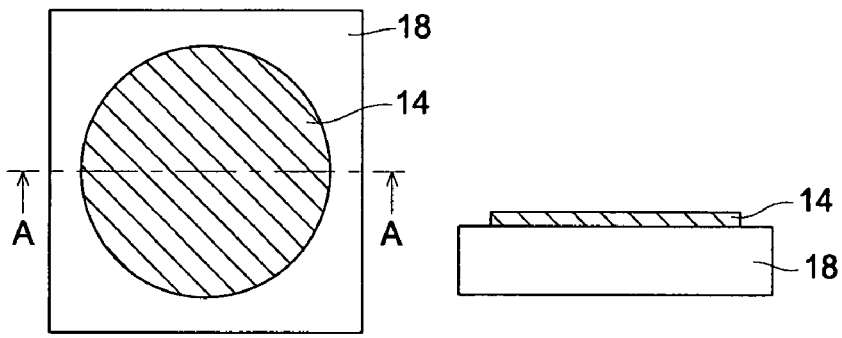

In the first step, solution A is printed on substrate 18 to form electrode layer 14 (FIG. 7(a)). The printing is conducted in a condition that the substrate 18 is heated to be 120° C. in order to evaporate the solvent after the printing. By waiting about 30 seconds after the printing, the solvent included in the printed solution A is evaporated, and the electrode layer 14 is formed. Heating of the substrate 18 can be done by using an electrical hot plate.

Figure 7B:
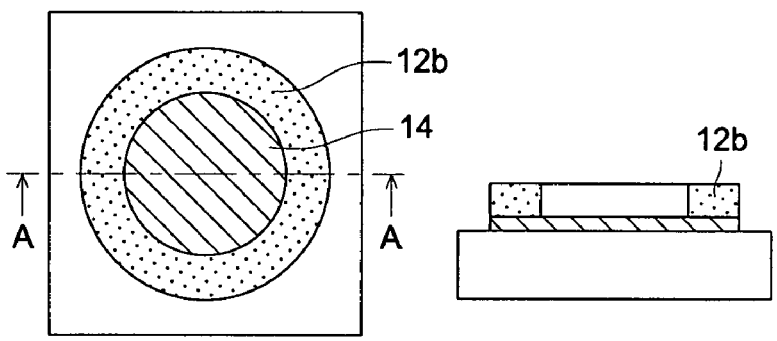
Figure 7C:
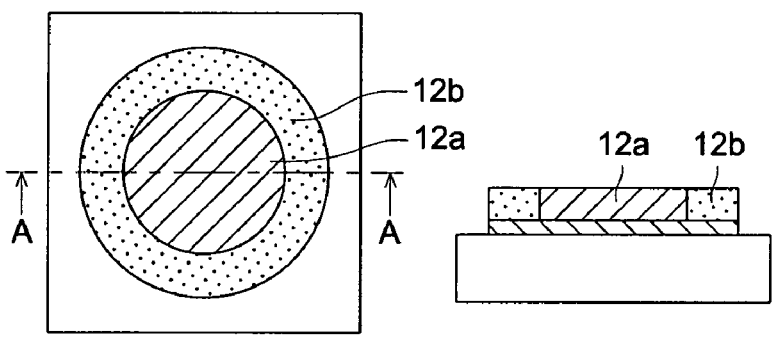

Next, the solution B is printed on the electrode layer 14 by using the stamp B, and the solvent is evaporated to form the peripheral area 12b of the shape-variable section (FIG. 7(b)). In this step, the printing is conducted so that the outer diameter edge of the peripheral area 12b is superposed on that of the electrode layer 14. After that, by using the stamp C, the solution C is printed on an exposed area left at a central part of the electrode layer 14, the solvent is evaporated and the center area 12a of the shape-variable section is formed (FIG. 7(c)).

Figure 7D:
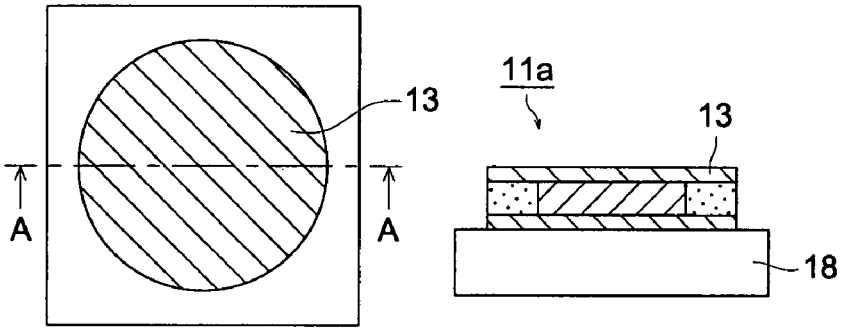

Further, the solution A is printed by using the stamp A, and the solvent is evaporated to form the electrode layer 13 (FIG. 7(d)). Lastly, the substrate 18 is removed, and the fabrication of the shape-variable optical element 11a provided with a shape-variable section having a distribution pattern of piezoelectric constant is completed.

Embodiment 2

FIGS. 2(a)-(c) are schematic diagrams representing an optical device 20 using a shape-variable optical element 21 in a second embodiment. FIG. 2(a) shows the status before the shape-variable optical element 21 is deformed, without voltage being applied. FIG. 2(b) shows the distribution of the piezoelectric constant in the shape-variable section 22. Further, FIG. 2(c) shows the status after the shape-variable optical element 21 is deformed, with voltage being applied.

Similarly to the case of the first embodiment, the shape-variable optical element 21 in the present embodiment is equipped with a shape-variable section 22 and a pair of electrode layers 13 and 14. It is a circular tabular transmission type optical element when voltage is not applied.

The vinylidene polyfluoride is used as the material of the shape-variable section 22. The piezoelectric constant of the vinylidene polyfluoride is so arranged as to form a symmetrical distribution with respect to the center axis 17 parallel to the direction of electric field, similarly to the case of the first embodiment. The difference from the first embodiment is that the distribution is patterned in such a way that the piezoelectric constant is the lowest at the center axis 17, and exhibits a continuous increase symmetrical with respect to the center axis 17, as one goes away from the center axis 17.

The vinylidene polyfluoride constituting the shape-variable section 22 is polarized in such a way that one electrode layer 13 forms a cathode and the other electrode layer 14 forms an anode. Under this condition, the switch 16 is made conductive. Then the cathode side of the power supply 15 is connected to the electrode layer 13 and the anode side of the power supply 15 is connected to the electrode layer 14. Voltage is applied to a pair of electrode layers 13 and 14. In this manner, electric field is applied in the same direction as that of the polarization, and therefore, the vinylidene polyfluoride expands in the direction of electric field.

The greater the piezoelectric constant, the greater will be the expansion. Thus, the distribution is patterned in such a way that the expansion of the shape-variable section 12 caused by electric field is the smallest at the center axis 17, and exhibits a continuous increase symmetrical with respect to the center axis 17, as one goes away from the center axis 17. Thus, the shape-variable optical element 21 is formed in a double concave as shown in FIG. 2(c). Accordingly, the parallel light having entered the shape-variable optical element 21 from the electrode layer 13 passes through the electrode layer 13, shape-variable section 22 and electrode layer 14 to go out of the electrode layer 14 as divergent light. The amount of deformation can be controlled by adjusting the voltage applied from the power supply 15.

Embodiment 3

Figure 3:
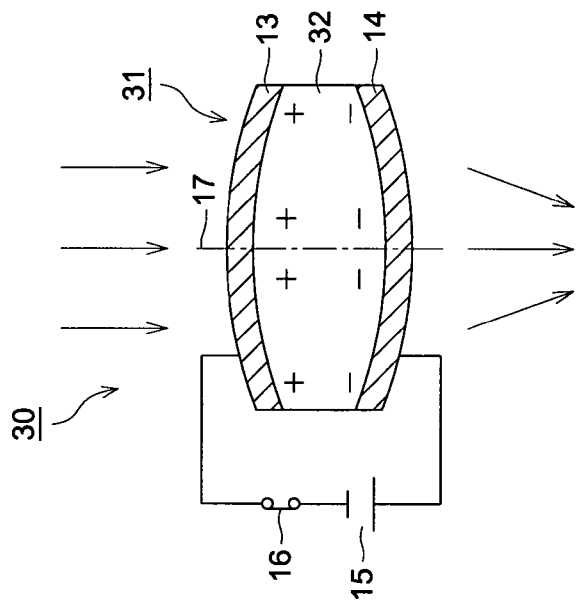
FIGS. 3(a)-(c) are schematic diagrams representing an optical device using a shape-variable optical element in a third embodiment.
Figure 3:
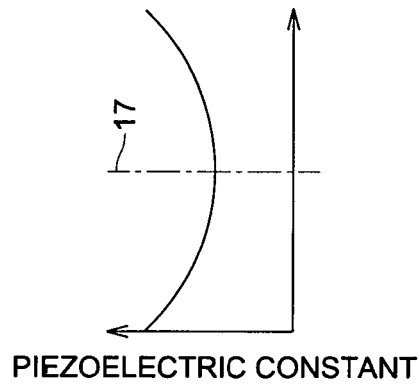
Figure 3:
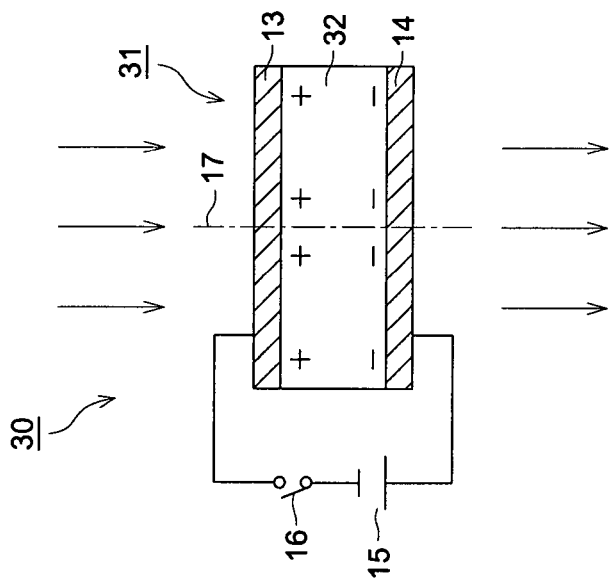

FIGS. 3(a)-(c) are schematic diagrams representing an optical device 30 using a shape-variable optical element 31 in a third embodiment. FIG. 3(a) shows the status before the shape-variable optical element 31 is deformed, without voltage being applied. FIG. 3(b) shows the distribution of the piezoelectric constant in the shape-variable section 32. Further, FIG. 3(c) shows the status after the shape-variable optical element 31 is deformed, with voltage being applied.

Similarly to the case of the second embodiment, the shape-variable optical element 31 in the present embodiment is equipped with a shape-variable section 32 and a pair of electrode layers 13 and 14. It is a circular tabular transmission type optical element when voltage is not applied. The vinylidene polyfluoride is used as the material of the shape-variable section 32. The distribution of the piezoelectric constant of the vinylidene polyfluoride and the direction of polarization are the same as those of the second embodiment.

Voltage is applied to a pair of the electrode layers 13 and 14 to deform the shape-variable section 32. The polarity of this voltage is the reverse to that in the case of the second embodiment. To be more specific, the cathode of the power supply 15 is connected to the electrode layer 14, and the anode of the power supply 15 is connected to the electrode layer 13. This arrangement allows the electric field to be applied in the direction reverse to that of polarization, whereby the vinylidene polyfluoride contracts in the direction of electric field.

In this case, the greater the piezoelectric constant, the greater will be the contraction. Thus, the distribution is patterned in such a way that the contraction of the shape-variable section 32 caused by electric field is the smallest at the center axis 17, and exhibits a continuous increase symmetrical with respect to the center axis 17, as one goes away from the center axis 17. Thus, the shape-variable optical element 31 is formed in a double convex as shown in FIG. 3(c). Accordingly, the parallel light having entered the shape-variable optical element 31 from the electrode layer 13 passes through the electrode layer 13, shape-variable section 32 and electrode layer 14 to go out of the electrode layer 14 as convergent light. In this case as well, the amount of deformation can be controlled by adjusting the voltage applied from the power supply 15.

Embodiment 4

FIGS. 4(a)-(b) are schematic diagrams of an image pickup apparatus 40 in a fourth embodiment. In the image pickup apparatus 40 of the present embodiment, the optical device 10 including the shape-shape-variable optical element 11 in the first embodiment is used as part of the pickup optical system.

The image pickup apparatus 40 of the present embodiment includes a pickup optical system 42 for forming a subject image and a CCD 43 as an image pickup element. The pickup optical system 42 is made up of a plurality of lens groups 41 and an optical device 10. In FIG. 4, the shape-variable optical element 11 is located on the rear of a plurality of the lens groups 41, without the structure of the pickup optical system 42 of the present invention being restricted thereto. For example, other lens groups can be arranged on the front and rear of the shape-variable optical element 11.

There is no restriction to the type of the image pickup element if the image formed by the pickup optical system can be converted into an electric signal. A CMOS sensor and others can be used, in addition to the CCD.

The optical device 10 has a function of adjusting the focus as part of the pickup optical system 42. FIG. 4 (a) shows formation of a subject image of a sufficiently long distance. In this case, the shape-variable optical element 11 is designed in a parallel and tabular configuration without voltage applied thereto, and is not provided with refractive power. Under this condition, the parallel light from a subject of sufficiently long distance forms an image on the light receiving surface of the CCD 43. In other words, the focus can be adjusted to a subject of sufficiently long distance.

FIG. 4(b) shows formation of the image of a subject closer than that of FIG. 4(a). In this case, voltage is applied to the shape-variable optical element 11 by the power supply 15. The shape-variable optical element 11 is deformed in a double convex lens, and is provided with refractive power. After having passed through a plurality of lens groups 41, the incident light from the subject is further refracted by the shape-variable optical element, and an image is formed on the light receiving surface of the CCD 43. In other words, the focus can be adjusted to a subject located closer than that in FIG. 4(a).

As described above, the focus of the pickup optical system 42 can be adjusted by adjusting the deformation of the shape-variable optical element 21. The deformation of the shape-variable optical element 21 is adjusted by applying voltage. The voltage applied to the shape-variable optical element 21 can be adjusted by the photographer operating the adjusting switch, or by the focus detecting apparatus automatically detecting the focus and adjusting the voltage.

In the present embodiment, the optical device 10 as part of the pickup optical system 42 has the function of adjusting the focus. Without being restricted thereto, the present invention can be provided with an optical zoom function in addition to the focus adjusting function, for example.

Embodiment 5

FIGS. 5(a)-(c) are schematic diagrams representing an optical device 50 having a shape-variable optical element 51 in a fifth embodiment. FIG. 5(a); shows the status before the shape-variable optical element 51 is deformed, without voltage being applied. FIG. 5(c) shows the status after the shape-variable optical element 51 is deformed, with voltage being applied.

The shape-variable optical element 51 in the present embodiment is equipped with a shape-variable section 52 and a pair of electrode layers 13 and 14. It is a regular square tabular optical element when voltage is not applied. A silver layer 56 as a mirror layer is formed on the surface of the electrode layer 13, and the electrode layer 14 is fixed to the insulated holding substrate 55 having sufficient rigidity. Unlike the shape-variable optical element of the aforementioned first through fourth embodiments, this shape-variable optical element 51 is a reflection type optical element that uses the light reflected from the shape-variable optical element 51.

Figure 5:
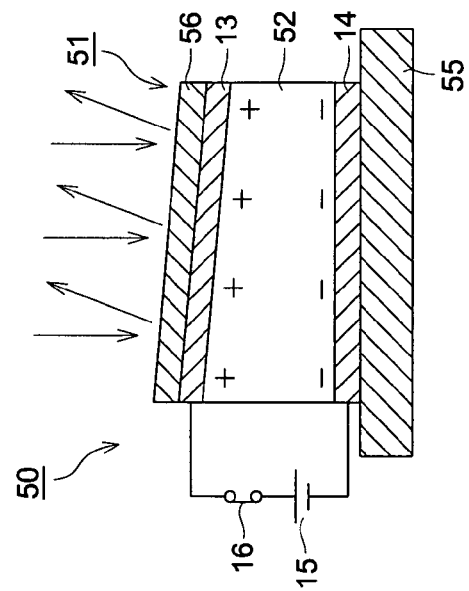
FIGS. 5(a)-(c) are schematic diagrams representing an optical device using a shape-variable optical element in a fifth embodiment.
Figure 5:
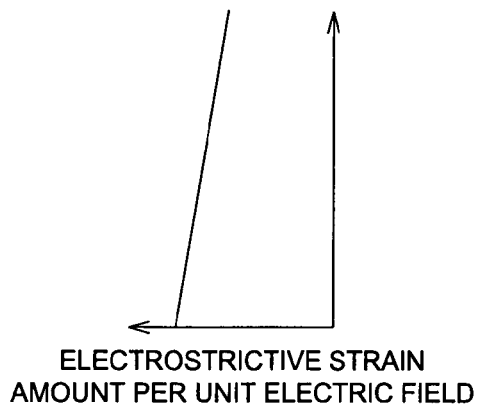
Figure 5:
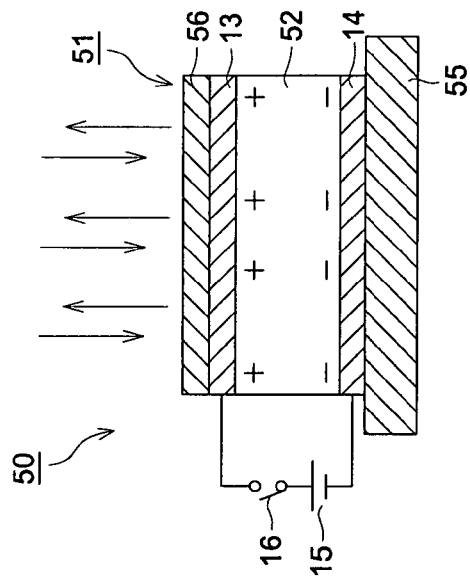

The P (VDF-TrFE) is used as a material of the shape-variable section 52. FIG. 5(b) shows the distribution of the electrostrictive strain of the P (VDF-TrFE) constituting the shape-variable section 52 per unit electric field. The distribution is patterned in such a way that the electrostrictive strain of the P (VDF-TrFE) per unit electric field is the highest on the left end in FIG. 5, and is linearly reduced as one goes to the right. It is the lowest on the right end. The electrostrictive strain of the P (VDF-TrFE) per unit electric field is constant along the depth in the drawing, without any distribution pattern.

The mirror layer on the surface of the electrode layer is not restricted to the silver layer. An appropriate one can be selected from among the commonly known mirrors, if provided with the required reflection factor. For example, it is possible to use a metallic mirror made of silver, gold or aluminum and a derivative multilayer film mirror. It is also possible to arrange such a configuration that light is reflected directly by the electrode layer, without a new mirror layer being provided on the surface of the electrode layer.

When voltage is not applied to the shape-variable optical element 51, the silver layer 56 is parallel to the holding substrate 55, and the incident light from the direction perpendicular to the holding substrate 55 is reflected in the perpendicular direction by the silver layer 56.

The P (VDF-TrFE) constituting the shape-variable section 52 is polarized in such a way that one electrode layer 13 forms a cathode and the other electrode layer 14 forms an anode. Under this condition, the switch 16 is made conductive. Then the cathode side of the power supply 15 is connected to the electrode layer 13 and the anode side of the power supply 15 is connected to the electrode layer 14. Voltage is applied to a pair of electrode layers 13 and 14. In this manner, electric field is applied in the same direction as that of the polarization, and therefore, the P (VDF-TrFE) expands in the direction of electric field.

The greater the electrostrictive strain per unit electric field, the greater will be the expansion of the P (VDF-TrFE). Thus, the distribution is patterned in such a way that the expansion of the shape-variable section 52 caused by electric field is the highest on the left end, and is linearly reduced as one goes to the right. It is the lowest on the right end. As a result, the shape-variable optical element 51 is deformed in a wedge form as shown in FIG. 5(c).

In this case, the silver layer 56 is tilted toward the holding substrate 55, and therefore, the incident light coming from the direction perpendicular to the holding substrate 55 is reflected in the direction opposite to that when voltage is not applied to the shape-variable optical element 51, in the silver layer 56.

Thus, the direction in which the reflected light is reflected in the silver layer 56 can be controlled by adjusting the voltage applied to the shape-variable optical element 51. Such an optical element can be used as an optical switch or the like. Further, a very compact multi-channel optical switch can be produced by arrangement of a plurality of such optical elements in a matrix form.

Embodiment 6

Figure 8:
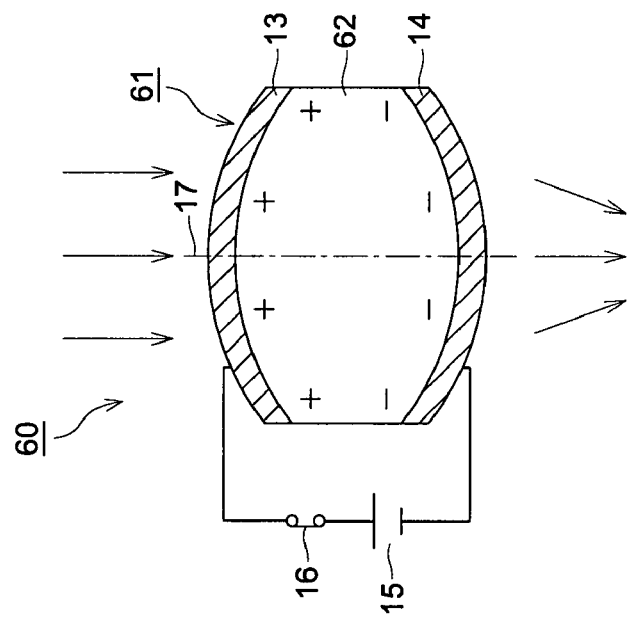
FIGS. 8(a)-(c) are schematic diagrams representing an optical device using a shape-variable optical element in a sixth embodiment.
Figure 8:
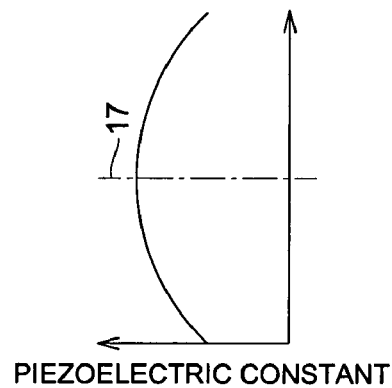
Figure 8:
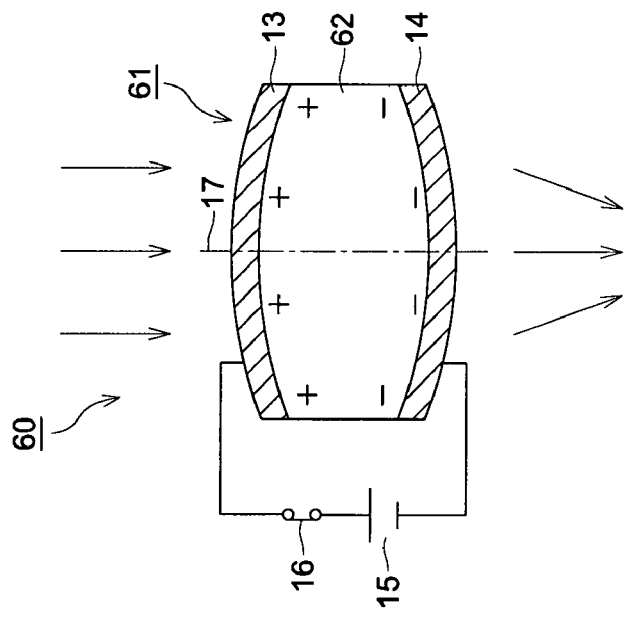

FIGS. 8(a)-(c) are schematic diagrams representing an optical device 60 utilizing a shape-variable optical element 61 in a sixth embodiment. FIG. 8(a) shows the status before the shape-variable optical element 61 is deformed, while voltage being not applied. FIG. 8(b) shows the distribution of the piezoelectric constant in the shape-variable section 62. FIG. 8(c) shows the status after the shape-variable optical element 61 is deformed, with voltage being applied.

Similarly to the case of the first embodiment, the shape-variable optical element 61 of the present embodiment is a transmission type optical element having a double convex shape such that a thickness at the center area is greater than at the peripheral area in the state of no voltage application, and functioning as a converging lens with positive power (FIG. 8(a)). As the material of the shape-variable section 62, vinylidene polyfluoride is used. In the present invention, since the shape-variable section is made of an organic material such as vinylidene polyfluoride, optical elements of variable shapes can be easily fabricated. The distribution pattern of piezoelectric constant in the shape-variable section 62 (FIG. 8(b)) and the polarization status are similar to those of the first embodiment.

In this condition, switch 16 is turned on to connect the positive pole of the power source 15 and the electrode layer 13, and connect the negative pole of the power source 15 and the electrode layer 14, thereby, an voltage is applied between the electrodes 13 and 14. In this manner, electric field is applied in the same direction as that of the polarization, therefore, the vinylidene polyfluoride expands in the direction of electric field.

Since, the greater the piezoelectric constant, the greater will be the contraction, the distribution is patterned in such a way that the contraction of the shape-variable section 62 caused by the electric field is the greatest at the center axis 17, and exhibits a continuous decrease symmetrical with respect to the center axis 17, as one goes away from the center axis 17. Thus, the shape-variable optical element 61 is decreased in curvature radius of the convex surface, and functions as the converging lens having further large power (FIG. 8(c)).

In the above, although an example of a case where a voltage is applied on an convex lens to make a smaller curvature radius of the convex surface is explained, in the similar way, other cases are possible where a voltage is applied onto a lens, which shaped concave before applying voltage, to make a curvature radius of the concave surface greater(make nearer to a flat plane), or where a voltage is applied on a concave surface to change it into a convex surface.

Further, the distribution of piezoelectric constant of the shape-variable section 62 can be patterned in such a way that the piezoelectric constant is the least at the position of center axis 17 and is increased symmetrically with respect to the center axis 17 on a continuous basis as one goes away from the center axis 17. By this, it is possible to make a curvature radius of a convex surface greater (make nearer to a flat plane), or to change a convex surface into a concave surface, by applying a voltage onto a convex lens. Further it is possible to make a curvature radius of a concave surface greater, by applying a voltage onto a convex lens.

The shape-variable optical element of the present invention is provided with a shape-variable section made of an organic material that is expanded and contracted in the direction of electric field, and a pair of electrode layers for sandwiching this shape-variable section. The expansion of the shape-variable section is provided with a distribution pattern by assigning a distribution pattern to the piezoelectric constant of the organic material constituting the shape-variable section and the electrostrictive strain per unit electric field. This arrangement permits the diameter to be increased and allows a simple structure to meet the requirements of a great variety of shapes.

What is claimed is:

1. A shape-variable optical element, comprising:
   a shape-variable section made of an organic material that can be expanded and contracted by an electric field, in a direction of the electric field; and
   a pair of electrode layers to sandwich the shape-variable section,
   wherein, a piezoelectric constant of the organic material varies depending on each position of the organic material in the shape-variable section on a surface perpendicular to the electric field,
   wherein amounts of expansion and contraction of the shape-variable section, which are generated by the electric field when a voltage is applied to the pair of electrode layers, have a distribution pattern in a surface perpendicular to the electric field.

2. The shape-variable optical element of claim 1, wherein the distribution pattern of the amounts of expansion and contraction is symmetrical with respect to a center axis of the shape-variable optical element, the center axis being parallel to the direction of the electric field.

3. The shape-variable optical element of claim 1, wherein the amounts of expansion and contraction are constant in a first direction and have a varied distribution pattern in a second direction, both the first and the second directions being in the surface perpendicular to the electric field, and being perpendicular with each other.

4. The shape-variable optical element of claim 1, wherein the shape-variable optical element is a transmission type optical element in which the shape-variable section and the pair of electrode layers are respectively made of translucent materials.

5. The shape-variable optical element of claim 1, wherein the shape-variable optical element is a reflection type optical element in which a mirror layer is formed on a surface of the shape-variable optical element.

6. An optical device comprising:
   the shape-variable optical element described in claim 1; and
   a power supply to apply a voltage onto the shape-variable optical element.

7. An image pickup apparatus comprising:
   a pickup optical system to form a subject image; and
   an image pickup element to convert the subject image into electric signals, wherein the pickup optical system comprises the optical device described in claim 6.

8. The shape-variable optical element of claim 1, wherein both of the pair of electrode layers being plane layers and parallel with each other when the electric field is not applied to the layers.

9. A shape-variable optical element, comprising:
   a shape-variable section made of an organic material that can be expanded and contracted by an electric field, in a direction of the electric field; and
   a pair of electrode layers to sandwich the shape-variable section,
   wherein, a property of the organic material with respect to an amount of expansion per unit volume of the organic material per applied electric field varies depending on each position of the organic material in the shape-variable section on a surface perpendicular to the electric field,
   wherein amounts of expansion and contraction of the shape-variable section, which are generated by the electric field when a voltage is applied to the pair of electrode layers, have a distribution pattern in a surface perpendicular to the electric field.

10. The shape-variable optical element of claim 9, wherein the distribution pattern of the amounts of expansion and contraction is caused by a distribution pattern of electrostrictive strain amounts per unit electric field of the organic material.

11. The shape-variable optical element of claim 9, wherein the distribution pattern of the amounts of expansion and contraction is caused by a distribution pattern of piezoelectric constants of the organic material.

* * * * *